Oct. 4, 1932.  P. F. J. RAPP  1,880,331
PORTABLE SPRAYING APPARATUS
Filed Jan. 16, 1932
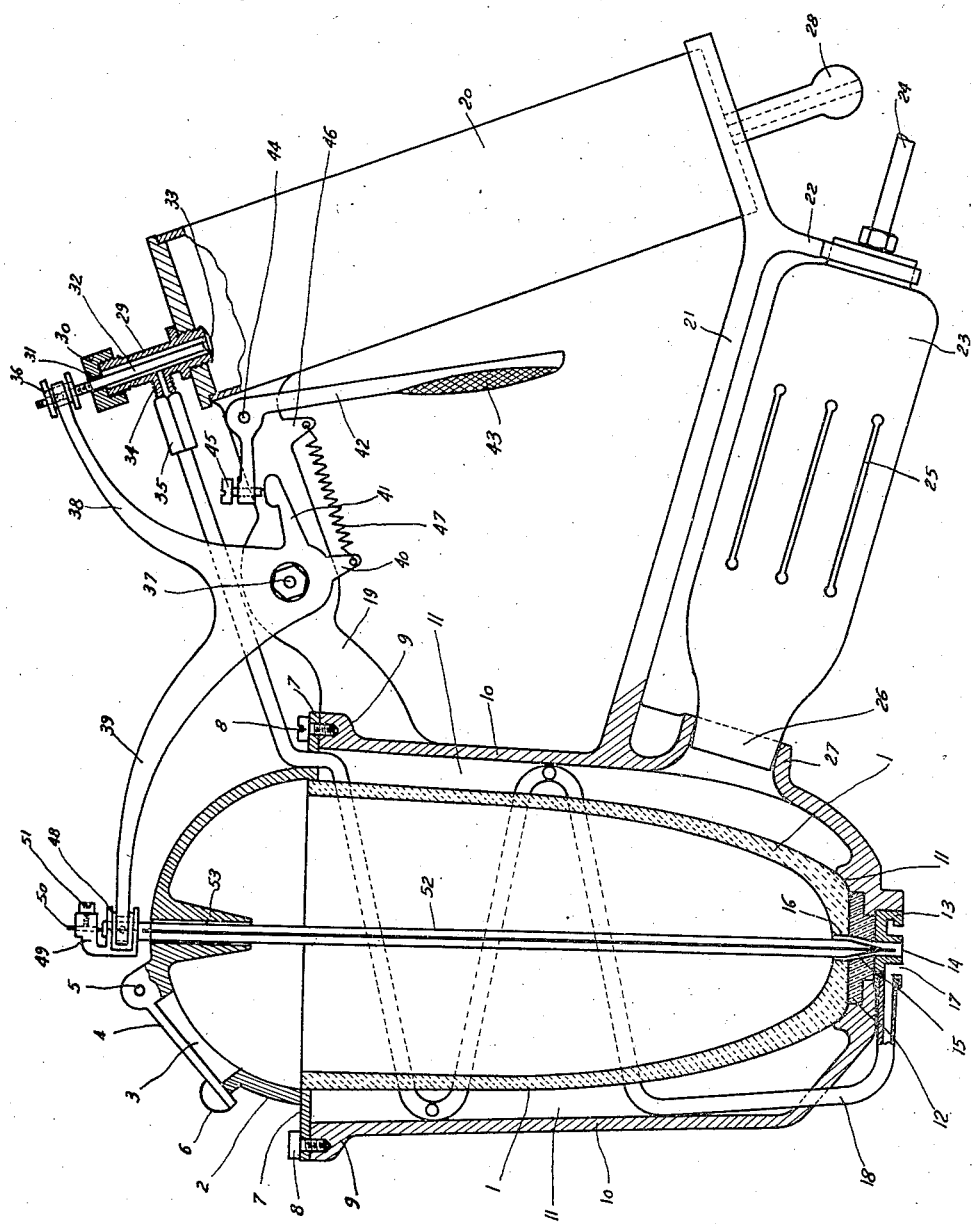
INVENTOR
P. F. J. RAPP
BY
ATTY.

Patented Oct. 4, 1932

1,880,331

UNITED STATES PATENT OFFICE

PIERRE FRÉDÉRIC JULES RAPP, OF FONTENAY SOUS BOIS, FRANCE

PORTABLE SPRAYING APPARATUS

Application filed January 16, 1932. Serial No. 587,059.

The present invention relates to devices utilizable for spraying molten substances such as metals or alloys, its primary object being to provide a portable self-contained spraying apparatus facilitating the operation of metallizing or similarly coating surfaces in the cold state, irrespective of their shape, curvature, outline or constitutive materials.

A further object of the invention is to provide a portable spraying apparatus or relatively light weight and reduced volume made up of a minimum number of parts, of cheap and rugged construction and easy manipulation.

A still further object of the invention is to provide a portable self-contained spraying apparatus wherein the container for the substance to be sprayed can be easily replenished and receives the thermal energy that melts said substance and keeps it in the molten state from an adjacent heater removably incorporated in the structure.

Still a further object of the invention is to provide a portable spraying apparatus wherein the metal or other substance after being molten in a closed container without contacting with the ambient air by convection heat from the heater incorporated in the structure is sprayed in a perfectly atomized state by a whisking jet of gaseous fluid under pressure that has been preheated in the apparatus by convection from the said heater, in its flow to the delivery nozzle.

Still a further object of the invention is to provide a portable self-contained spraying apparatus wherein the handle is formed as a chamber through which the incoming fluid passes on its way to the nozzle before being preheated, so that said handle although located adjacent the heater is kept continuously cool and the operator's hand can thus grasp said handle and support the apparatus without becoming scorched or burnt.

Still a further object of the invention is to provide a portable self-contained spraying apparatus wherein the container for the substance to be molten and sprayed, the heater for melting said substance and the handle form a unitary trapezoidal structure providing a free central space wherein is located the operating member which permits the operator to simultaneously regulate the supply of compressed fluid and the ejection of the molten substance to be sprayed.

Still another object of the invention is to provide a portable self-contained spraying apparatus wherein the member for simultaneously regulating the supply of compressed fluid and the ejection of the molten substance to be sprayed is in the form of a trigger-like lever pivotally mounted in the central free space of the structure and located within easy reach of the operator's hand that grasps the handle, whereby said operator can single-handed manipulate the apparatus and regulate said supply and said ejection while keeping his other hand perfectly free.

Still another object of the invention is to provide a spraying apparatus wherein the outlet for the molten substance to be sprayed can be controlled very finely for regulating the richness of the atomized mixture depending upon the nature or contexture of the surface to be metallized or otherwise coated and wherein moreover said outlet can be readily freed by operating the trigger-like lever in the event of its becoming choked by said substance.

With these and such other objects in view as will incidentally appear hereinafter, the invention comprises the novel construction and arrangement of parts that will now be described with reference to the accompanying diagrammatic drawing forming a part of the present disclosure and illustrating, by way of example, a practical embodiment of the portable spraying apparatus according to the invention.

As illustrated, the spraying apparatus comprises primarily a refractory or fireproof container or crucible 1 adapted to receive a certain quantity of the substance to be molten and sprayed, for instance metal, alloy, wax, paraffine, glass, etc. This container is constituted by a deep crucible of conventional ovoidal curvature and is advantageously made of a pottery-like material and closed by a dome-shaped cover 2 made for example of cast iron. This cover 2 has a side opening 3 closed by a door 4 pivotally supported at 5 and fitted with a counterweight 6 to remain in closed position. The dome-shaped cover 2 of the crucible 1 has side lugs 7 through which engage screws 8 which hold said cover down tightly upon the mouth of said crucible 1 by holding said lugs 7 upon corresponding bosses 9 formed upon a metal jacket 10 so sized and shaped as to provide an annular clearance 11 around the crucible 1.

The end of the jacket 10 remote from the bosses 9 is so shaped internally as to provide bearing surfaces 11 for the polar region of the ovoidal crucible 1 and so hollowed as to permit the insertion of a refractory washer 12 (made for example of graphite, quartz or steatite) and of a nozzle 13 made of a non-oxidizable metal. The nozzle 13 is formed with a cylindrical central bore 14 in alignment with a tapering central bore 15 formed in the refractory washer 12 and with a cylindrical polar bore 16 formed in the apex portion of the crucible 1, the three bores 14, 15, 16 delineating a straight channel for the ejection of the molten substance to be sprayed, as will be described hereafter.

The nozzle 13 is formed with an annular groove or channel 17 having a countersunk portion connected to a fluid pipe 18 which passes up through the adjacent portion of the jacket 10 into the clearance 11 and is coiled around the crucible 1 and extends out of the said jacker. The purpose of this pipe 18 is to bring a gaseous fluid under pressure, for example compressed air, to the annular groove 17 to circumscribe the jet of molten substance through the central outlet bore 14 and intermingle therewith for atomizing it while reducing its temperature.

The jacket 10 carries adjacent one of the bosses 9 an outwardly extending bracket 19 terminally supporting a hollow handle 20 the base of which is carried by a cranked prop 21 having an arm 22 by which is carried the base of a heater 23. In the embodiment shown, this heater is constituted by a burner fitted with a fuel gas inlet tube 24, with air inlet slots 25 and with a flame outlet 26 removably engaged into a correspondingly sized flanged opening 27 of the jacket 10 adjacent the bored end of the crucible 1, the flames from the heater or burner 23 thus heating the wall of the crucible by direct contact and melting and then keeping the substance to be sprayed in the molten state while at the same time convection heat through the clearance 11 preheats the pressure fluid in the pipe 18 leading to the nozzle 13.

The hollow handle 20 is fitted adjacent its lower supporting prop 21 with an inlet nipple 28 to which may be removably connected a pressure fluid pipe or hose (not shown) from any suitable source. Adjacent the upper supporting bracket 19, the handle 20 is provided with an outlet nipple constituted by a tube 29 closed at its outer extremity by a cap 30 fitted with a gasket 31 through which passes the stem 32 of a mushroom valve 33 having its seat on the inner end of said tube 29 and displaceable for controlling the egress of the pressure fluid from the capacity of the handle 20. The tube 29 has a side branch 34 connected by a fluid-tight joint 35 to the pipe 18, whereby the compressed fluid entering the handle by the inlet nipple 28 can pass into said pipe when the valve 33 is off its seat.

The valve stem 32 projects out of the cap 30 provided with the gasket 31 and is screw-threaded on its projecting portion to adjustably carry a grooved bushing 36 for a purpose to be described hereafter.

The bracket 19 is fitted intermediate its ends with a pin 37 on which is pivotally mounted a two-armed or two-horned link 38—39 having angularly disposed lugs 40, 41. A trigger-like cranked lever 42 advantageously fitted with a grip (for example knurled) portion 43 is pivotally fulcrumed at 44 on the bracket 19 adjacent the upper end of the handle 20. The shorter arm of the lever 42 is fitted with an adjustable screw 45 the tip of which permanently abuts on the lug 41 formed on the boss of the link 38—39, whereby adjustment of the screw 45 permits to regulate the engagement of the lever 42 and said link.

The bracket 19 is formed with a lug 46 to which is attached the one end of a spring 47 the other end of which is attached to the lug 40 formed on the boss of the link 38—39, so that the lug 41 of said link can be held in permanent engagement with the screw 45 carried by the lever 42.

The arm or horn 38 of the link directed towards the handle 20 is terminally forked for engaging the middle part of the bushing 36 adjustably fitted, as above-stated, on the stem 32 of the valve 33. The other arm or horn 39 of the link 38—39 i. e. that arm remote from the handle 20 is also terminally forked for engaging a bushing 48 having an overhanging extension 49 through which freely passes a nickel rod 50 adjustably clamped in said extension by a set screw 51. The rod 50 forms the central core of a hollow needle valve 52 passing through an inner boss 53 of the cover 2 and having its remote end tapered and snugly engaged into the crucible outlet bore 16 and seating against the washer bore 15 of corresponding conicity.

The needle valve 52 is advantageously made of a refractory material such as graphite or quartz and the core rod 50 is engaged through it slidably. The end of this core rod projects over an adjustable distance from the tapered end of the valve 52 to penetrate into the central bore 14 of the nozzle 13. By unscrewing the set screw 51, it is possible to vary the said distance for regulating the egress of the molten substance out of the crucible 1 through the bore 14. This may be necessitated by the kind of work to be performed or by the nature or contexture of the surface to be metallized or coated.

The operation of the apparatus will be readily understood from the foregoing description. It will be easily appreciated that the operator can, single-handed, manipulate the apparatus by supporting the handle 20 in one hand while keeping one or two fingers of said hand upon the trigger-like actuating lever 42, whereupon by pressing upon said lever, he can permit simultaneous egress of the molten substance from the crucible 1 through the bore 14 and of the compressed fluid through the groove of the nozzle 13. As the lever 42 is so sized and fulcrumed as to be highly responsive to each tiny stress exerted by the operator's fingers, very fine adjustment in the spraying process may be performed. Moreover, by adjusting the position of the bushings 36 and 48, the proportions of molten substance and compressed fluid may be regulated very easily and very accurately which enables the work to be conducted exactly as desired, depending on the result to be obtained.

Should the bore 14 of the nozzle 13 become choked or clogged by the molten substance or an extraneous matter, it is only necessary for the operator to move the lever 42 to and fro to displace the end of the rod 50 through said bore and promptly free it.

Such a portable spraying apparatus may be used for manifold purposes, for example, as above-stated, for metallizing or similarly coating various surfaces of wood, plaster, cement, glass, metal, fabric, paper, etc., with a view to protecting or sheltering them from corrosive or atmospheric influences, to polishing, decorating or otherwise modifying their surface. Amongst other industrial uses of the apparatus, may be mentioned the manufacture of plates for electric accumulators.

Numerous minor constructional details might be changed without departing from the scope of the invention as defined by the subjoined claims.

What I claim is:

1. A portable spraying apparatus comprising, in combination, a crucible for the substance to be sprayed, said crucible having an outlet bore and a filling opening, a jacket providing an annular clearance around the crucible and fitted with an annularly grooved nozzle having a central bore coincident with the crucible outlet bore, a fluid pipe connected to the nozzle groove and passing through said clearance, a needle valve seated in the crucible outlet bore, a hollow handle having an inlet connectable to a source of pressure fluid and an outlet controlled by a valve and connected to said pipe, a heater connected with said clearance, the jacketed crucible, handle and heater forming a trapezoidal structure providing a central free space, a controlling lever located in said space adjacent the handle, and a connection between said lever and said valves for permitting a simultaneous control of the ejection of fluid and sprayable substance.

2. A portable spraying apparatus comprising, in combination, a crucible for the substance to be sprayed, said crucible having an outlet bore at one end and a removable cover formed with a filling opening at its opposite end, a jacket providing an annular clearance around the crucible and fitted with an annularly grooved nozzle having a central bore, a refractory washer interposed between the crucible and nozzle and bored coincidently, a needle valve seated by its tapering end in the crucible and washer bores and having an axial extension freely engaging the nozzle bore, said needle valve projecting out of the crucible cover, a fluid pipe connected to the nozzle groove and coiled around the crucible in said clearance, a hollow handle having an inlet connectable to a source of pressure fluid and an outlet controlled by a valve and connected to said pipe, a heater communicating with said clearance adjacent the outlet of the crucible, the handle, heater and jacketed crucible forming a trapezoidal structure providing a central free space, a controlling lever located in said space adjacent the handle, and a connection between said lever and said valves for permitting a simultaneous control of the ejection of fluid and sprayable substance.

3. A portable spraying apparatus comprising, in combination, an elongated crucible for the substance to be sprayed, said crucible having an outlet bore at one end and a filling opening near its opposite end, a jacket providing an annular clearance around the crucible and fitted with an annularly grooved nozzle having a central bore coincident with the crucible outlet bore, a fluid pipe connected to the nozzle groove and passing through said clearance, a needle valve seated in the crucible outlet bore, a bracket carried by the jacket, a hollow handle supported by said bracket and having an inlet connectable to a source of pressure fluid and an outlet controlled by a valve and connected to said pipe, a heater connected with said clearance, the jacketed crucible, handle and heater forming a trapezoidal structure providing a central free space, a lever pivotally fulcrumed on said bracket and projecting into said space adjacent the handle, and a spring-influenced link fulcrumed on said bracket and abutted on the lever, said link being connected to said valves for permitting a simultaneous control of the ejection of fluid and sprayable substance by a pivotal motion of the lever.

4. A portable spraying apparatus comprising, in combination, an elongated crucible for the substance to be sprayed, said crucible having an outlet bore at one end and a removable cover provided with a filling door at its opposite end, a jacket providing an annular clearance around the crucible and fitted with an annularly grooved nozzle having a central bore coincident with the crucible outlet bore, a coiled fluid pipe connected to the nozzle groove and passing through said clearance, a needle valve seated by its tapered end in the crucible outlet bore and having its stem projecting out of the crucible cover, a bracket carried by the jacket, a hollow handle supported by said bracket and having at one end an inlet nipple connectable to a source of pressure fluid and at its opposite end an outlet nipple controlled by a valve and connected to said pipe, the last-named valve having its stem projecting out of said outlet nipple, a heater connected with said clearance, the jacketed crucible, handle and heater forming a trapezoidal structure providing a central free space, a trigger-like lever pivotally fulcrumed on said bracket and projecting into said space adjacent the handle, and a spring-influenced two-armed link fulcrumed on said bracket and abutted on the lever, the arms of said link being connected respectively to the stems of said valves for permitting a simultaneous control of the ejection of fluid and sprayable substance by a pivotal motion of the lever.

5. A portable spraying apparatus comprising, in combination, an elongated crucible for the substance to be sprayed, said crucible having an outlet bore at one end and a cover provided with a filling door fitting its opposite end, a jacket removably carrying said cover and providing an annular clearance around the crucible, said jacket being fitted with an annularly grooved nozzle having a central bore coincident with the crucible outlet bore, a refractory washer interposed between the crucible and nozzle and bored coincidently, a fluid pipe connected to the nozzle groove and coiled around the crucible in said clearance, a needle valve seated by its tapered end in the crucible and washer bores and having its stem projecting out of the crucible cover and fitted with an adjustable bushing, a bracket carried by the jacket, a hollow handle supported by said bracket and having an inlet connectable to a source of pressure fluid and an outlet controlled by a valve and connected to said pipe, the last-named valve having its stem projecting out of the handle outlet and fitted with an adjustable bushing, a heater connected with said clearance, the jacketed crucible, handle and heater forming a trapezoidal structure providing a central free space, a lever pivotally fulcrumed on said bracket and projecting into said space adjacent the handle, and a spring-influenced two-armed link fulcrumed on said bracket and abutted on the lever, the arms of said link respectively engaging the bushings on the stems of said valves for permitting a simultaneous control of the ejection of fluid and sprayable substance by a pivotal motion of the lever.

6. A portable spraying apparatus comprising, in combination, an elongated crucible for the substance to be sprayed, said crucible having an outlet bore at one end and a cover provided with a filling door fitting its opposite end, a jacket removably carrying said cover and providing an annular clearance around the crucible, said jacket being fitted with an annularly grooved nozzle having a central bore coincident with the crucible outlet bore, a refractory washer interposed between the crucible and nozzle and bored coincidently, a fluid pipe connected to the nozzle groove and coiled around the crucible through said clearance, a needle valve seated by its tapered end in the crucible and washer bores and having an axial core slidably mounted in said valve and freely projecting into the nozzle bore, said core protruding out of the crucible cover and being fitted with an adjustable bushing, a bracket carried by the jacket, a hollow handle supported by said bracket and having an inlet connectable to a source of pressure fluid and an outlet controlled by a valve and connected to said pipe, the last-named valve having its stem projecting out of the handle outlet and fitted with an adjustable bushing, a heater connected with said clearance, the jacketed crucible, handle and heater forming a trapezoidal structure providing a central free space, a lever pivotally fulcrumed on said bracket and projecting into said space adjacent the handle, and a spring-influenced two-armed link fulcrumed on said bracket and abutted on the lever, the arms of said link respectively engaging the bushings of said valves for permitting a simultaneous control of the ejection of fluid and sprayable substance by a pivotal motion of the lever.

7. A portable spraying apparatus comprising, in combination, an elongated crucible for the substance to be sprayed, said crucible having an outlet bore at one end and a flanged cover provided with a filling door at its opposite end, a jacket removably secured to the flange of said cover and providing an annular clearance around the crucible, said jacket being fitted with an annularly grooved nozzle having a central bore coincident with the crucible outlet bore, a refractory washer interposed between the crucible and nozzle and bored coincidently, a fluid pipe connected to the nozzle groove and coiled around the crucible through said clearance, a needle valve seated by its tapered end in the crucible and washer bores and having a slidable axial core rod having one of its ends projecting into the nozzle bore and its opposite end protruding out of the crucible cover and adjustably held in a bushing carried by the adjacent end of said valve, a bracket carried by the jacket, a hollow handle supported by said bracket and having an inlet nipple connectable to a source of pressure fluid and an outlet nipple controlled by a valve and communicating with said pipe, the last-named valve having its stem projecting out of the handle outlet nipple and fitted with an adjustable bushing, a prop connecting the jacket and handle, a heater removably carried by said prop and communicating with the clearance adjacent the outlet of the crucible, the jacketed crucible, handle and heater forming a trapezoidal structure providing a central free space, a trigger-like lever pivotally fulcrumed on said bracket and projecting into said space adjacent the handle, and a spring-influenced two-armed link fulcrumed on said bracket and abutted on the lever, the arms of said link respectively engaging the bushings of the two valves for permitting a simultaneous control of the ejection of fluid and sprayable substance by a pivotal motion of the lever.

In testimony whereof I affix my signature.

PIERRE FRÉDÉRIC JULES RAPP.